Patented Nov. 30, 1948

2,455,061

UNITED STATES PATENT OFFICE 2,455,061

TREATMENT OF LIQUID HYDROCARBONS

Charles O. Hoover, Houston, Tex., assignor to Air Reduction Company, Incorporated, New York, N. Y., a corporation of New York No Drawing. Application January 31, 1945, Serial No. 575,567

5 Claims. (Cl. 196—30)

This invention relates to the treatment of liquid hydrocarbons containing undesirable sulfur compounds and more particularly to the treatment of liquid hydrocarbons for the elimination of such sulfur compounds in the form of hydrogen sulfide, mercaptans or disulfides.

The treatment of hydrocarbons for the elimination of hydrogen sulfide and mercaptans is well known in the art and many methods with this object in view have been developed. One of the most widely used is the so-called "doctor" treatment which makes use of sodium plumbite and elemental sulfur for the removal of hydrogen sulfide and mercaptans. Other well known methods for the removal of mercaptans include catalytic oxidation by means of air or oxygen in the presence of various catalysts such as copper, nickel, iron, or cobalt; oxidation by hypochlorites, and the like.

Any method of treatment which requires the addition of elemental sulfur to the hydrocarbon, as in the "doctor" treatment, is particularly hazardous since great care must be taken or the total sulfur content of the treated hydrocarbon may actually be greater than in the untreated state. Such elemental sulfur may be readily and often is converted on subsequent heating to hydrogen sulfide or polysulfide compounds which are highly corrosive and extremely undesirable in gasolines which are to be leaded by the addition of such compounds as tetraethyl lead.

While the known methods are more or less effective for the removal of mercaptan sulfur, they have in common the disadvantage that they may cause but little reduction in the total sulfur content of the material so treated. This is due to the fact that the mercaptans are oxidized in whole or in part to disulfides, which are not removed from the hydrocarbon by the added reagent.

For example, it is old in the art to treat hydrocarbons with cupric compounds for the removal of mercaptans. In accord with the known reaction in this case, $$4RSH + 2CuX_2 \rightarrow 2CuSR + R_2S_2 + 4HX$$

(wherein R represents an alkyl radical, X an acid radical such as naphthenate for example, SH represents a mercaptan radical and $R_2S_2$ represents an alkyl disulfide) one half of the mercaptan is combined as cuprous mercaptide while the remaining half is oxidized to the corresponding disulfide. On distillation the disulfide will be found in the distillate since the presence of cupric naphthenate will not prevent the distillation of the disulfide. Consequently the use of this method will result in the appearance in the distillate obtained from the treated material of those disulfides originally present and also an added amount equivalent to approximately half of the original mercaptan content. In the case of the sodium plumbite sweetening method substantially all the mercaptans are converted to disulfides.

The disulfides, while negative to the "doctor" test and not particularly corrosive, are undesirable for several reasons. When present in motor fuels they reduce the clear octane number as well as the lead susceptibility, and when burned as in engines they may produce corrosive sulfur dioxide. If disulfides are present in hydrocarbons which are to be catalytically treated, the sulfur contained therein often reacts with the catalyst to reduce its activity, or if high temperatures are involved, decomposes with the formation of highly corrosive sulfur compounds.

It is the object of this invention to provide a method for the removal of hydrogen sulfide, mercaptans and disulfides from organic liquids; to provide in particular for the removal of these three types of sulfur compounds from petroleum hydrocarbons; to prevent formation of elemental sulfur or hydrogen sulfide due to the thermal decomposition of cupric sulfide or as a result of the reaction between cupric sulfide and hydrocarbons at elevated temperatures; to provide a method of preparing power fuels having increased octane rating and lead susceptibility and to decrease the losses due to corrosion of processing equipment. The method is applicable to organic liquids and particularly to hydrocarbons, which contain hydrogen sulfide, mercaptans or disulfides, regardless of their origin, e. g., petroleum, shale, destructive distillation of coal, and the like.

This invention also provides for the elimination of hydrogen sulfide, mercaptans and disulfides which may be formed from the reactions occurring between elemental sulfur and hydrocarbons, particularly on heating.

Other objects and advantages of the invention will be apparent as it is better understood by reference to the following specification, in which the preferred embodiments are described.

The improved method comprises the treatment of organic liquids containing sulfur in the form of hydrogen sulfide, mercaptans or disulfides, with a suitable metallic compound in the lower state of valence. As will be shown later in the examples, the state of valence of the metallic treating compound is extremely important. I prefer to use cuprous naphthenate since it is readily prepared and has good solubility in hydrocarbons.

I have discovered that the treatment of a mercaptan with cuprous naphthenate results in complete transformation of the mercaptan to cuprous mercaptide. There is substantially no oxidation of mercaptans to disulfides as is the case when cupric naphthenate is used. While many of the mercaptans present in liquid hydrocarbons form insoluble cuprous mercaptides, it is not necessary to the operation of the method that all the cuprous mercaptides so formed shall be insoluble. The treated hydrocarbon may be filtered or distilled as circumstances may dictate, to obtain a product free from mercaptans and containing substantially no disulfides.

I have further discovered that a similar treatment with cuprous naphthenate of liquid hydrocarbons containing organic disulfides will so fix the latter sulfur-bearing compounds that subsequent distillation will give products substantially free from disulfides.

I have also discovered that the cuprous sulfide which is formed when liquid hydrocarbons containing hydrogen sulfide are treated with cuprous naphthenate does not readily react with hydrocarbons or dissociate to form elemental sulfur or hydrogen sulfide. It is therefore possible to distill hydrocarbon mixtures containing cuprous sulfide at relatively high temperatures without the formation of appreciable amounts of hydrogen sulfide. This is not the case where cupric compounds are used as treating agents, as was formerly done in the petroleum industry.

The amount of cuprous napthenate that will be required to fix these sulfur compounds will depend on the nature of the material being treated as well as upon the type and amount of each sulfur-bearing compound present. It is not always possible to predict the minimum amount of cuprous naphthenate required by analytical data alone, and I prefer to determine the proper dosage by actual test. The amounts of cuprous naphthenate specified in the accompanying examples are, therefore, only illustrative and are not intended to limit the invention.

Cuprous naphthenate may be prepared in any convenient way, for example, by reduction from the cupric form. Since cuprous naphthenate is readily oxidized on exposure to air, it is essential that it be prepared and stored in the absence of air or oxygen. This may be readily accomplished by means of an inert gas such as nitrogen, carbon dioxide, methane, or the like.

The cuprous naphthenate may be added to the hydrocarbon to be treated either in the solid state, or preferably dissolved in a suitable solvent. Naturally one would choose a solvent which would interfere as little as possible with subsequent operations. If a gasoline fraction is to be treated, the cuprous naphthenate may be dissolved in a portion of the gasoline. Addition to the untreated material may be accomplished in any suitable manner. For example, proportioning pumps may be used to continuously mix predetermined amounts of cuprous naphthenate solution with the hydrocarbon undergoing treatment, or the mixtures may be made batch-wise by mixing suitable amounts of the materials.

It is not essential to the operation of this invention that the mixture of cuprous naphthenate and sulfur-bearing compound be heated in order to fix the sulfur. While it is true that distillation must often be resorted to in order to obtain the desired hydrocarbons, the chemistry of the reaction whereby the sulfur is fixed, appears to be complete at ordinary temperature. Nevertheless heating to any desired temperature is within the scope of the invention.

Since cuprous compounds will fix both mercaptans and hydrogen sulfide without subsequent formation of hydrogen sulfide on heating, it is evident that petroleum products prepared according to this invention will contain little or none of the corrosive types of sulfur compounds such as hydrogen sulfide, mercaptans and disulfides. The treatment of hydrocarbons containing corrosive sulfur compounds with cuprous naphthenate will not only remove the so-called "acidic" sulfur at once, but it will also ensure the absence of corrosive sulfur in the distillates obtained from such hydrocarbons.

One of the most important results of this invention is the decrease in the losses due to corrosion of processing equipment. The losses suffered by refineries which are directly attributable to corrosion are enormous. Hydrogen sulfide, which is often found in natural gas or dissolved in crude petroleum, is also formed at high temperatures by the decomposition of other sulfur compounds. It rapidly attacks steel parts that are exposed to it either at ordinary or elevated temperatures. Storage tanks, gas lines as well as pipestill tubes, evaporators and fractionators are some of the equipment that suffers from this corrosion. The equipment used in the catalytic cracking of sulfur bearing hydrocarbons is especially liable to corrosion and much time and equipment is lost because of this heretofore unsolved problem.

The improved method is usable with the present standard refinery equipment and methods of processing. No substantial changes will be required to utilize the advantages of the invention, thus adding materially to the economy resulting from its use.

The following examples illustrate the operation of my invention as well as its advantages.

*Example 1*

To 200 grams of a solution of cuprous naphthenate in Nujol, containing the equivalent of about 11.0 grams of copper, in a 500 cc. distilling flask, at room temperature, in the absence of air, there was added 100 cc. of V. M. P. naphtha and 100 cc. of a kerosene solution of ethyl mercaptan containing the equivalent of 1.96 grams of sulfur. The mixture was distilled and the fractions, free from hydrogen sulfide, were analyzed for mercaptan and disulfide sulfur.

| Fraction, °C. | Per cent of added sulfur present as— | |
| --- | --- | --- |
| | Mercaptans | Disulfides |
| −167 | 0.0 | 3.2 |
| 167–250 | 0.0 | 1.1 |

A blank determination of the sulfur in the Nujol, kerosene, V. M. P. naphtha mixture showed that similar fractions contained only 0.026 gram of sulfur, none of which was present as mercaptan or disulfide sulfur.

For comparison the same amount of ethyl mercaptan in the Nujol, kerosene, V. M. P. naphtha mixture was treated with cupric naphthenate and distilled as before. The fractions were analyzed and gave the following data:

| Fraction, °C. | Per cent of added sulfur present as— | |
| --- | --- | --- |
| | Mercaptans | Disulfides |
| −160 | 0.0 | 35.1 |
| 160–241 | 0.0 | 3.7 |

*Example 2*

Methyl disulfide was treated with cuprous naphthenate as follows: to a solution of cuprous naphthenate in Nujol, containing about 13.8 grams of copper, at room temperature, there was added 100 cc. V. M. P. naphtha and 100 cc. of a kerosene solution of methyl disulfide containing the equivalent of 1.07 grams of sulfur. The mixture was distilled and the hydrogen sulfide-free fractions were analyzed for mercaptan and disulfide sulfur, with the following results.

| Fraction, °C. | Percent of added sulfur present as— | |
| --- | --- | --- |
| | Mercaptans | Disulfides |
| −149 | 0.0 | 10.5 |
| 149–244 | 0.0 | 7.7 |

For comparison a similar mixture containing the same amount of methyl disulfide was treated with cupric naphthenate and distilled. The fractions were analyzed for mercaptan and disulfide sulfur.

| Fraction, °C | Percent of added sulfur present as— | |
| --- | --- | --- |
| | Mercaptans | Disulfides |
| −169 | 0.0 | 64.8 |
| 169–241 | 0.0 | 3.6 |

*Example 3*

A mixture of Nujol, kerosene and V. M. P. naphtha as described above, containing 6.75 cc. pure n-butyl mercaptan and cuprous naphthenate equivalent to 6.4 grams of copper was distilled as in Examples 1 and 2. The distillate collected up to 235° C. contained no hydrogen sulfide, no mercaptans and no disulfides.

*Example 4*

Six grams of cuprous naphthenate were dissolved in 50 cc. of white oil at room temperature with a protecting atmosphere of nitrogen. To this was added 250 cc. of pressure distillate obtained from a West Texas crude oil, having a sulfur content of 0.28% by weight and containing both mercaptans and disulfides. On distillation, 82.5% of the pressure distillate was recovered up to 174° C. No hydrogen sulfide was evolved during distillation and the distillate contained no mercaptans or disulfides.

The invention provides a method whereby hydrocarbons contaminated with either hydrogen sulfide, mercaptans, disulfides singly or in admixture, may be treated to provide products completely or substantially free from these three types of sulfur compounds. The method is equally applicable to those cases where hydrogen sulfide, mercaptans or disulfides are absent in the material to be treated, but formed therein as a result of heat treatment, distillation or the like. This process gives entirely unexpected results based upon the knowledge acquired by treatment of such sulfur compounds with cupric salts. The invention is a distinct advance in the art, since it offers a method whereby both the active and potential corrosiveness of hydrocarbons may be eliminated or very substantially decreased. It has the further advantage that it does not remove the natural gum-inhibitors present in some gasolines as do many of the methods now in use for removing mercaptans.

While cuprous naphthenate is the preferred reagent in the method, other lower valence compounds such as the oleate, linoleate, and the like may be used. I have also used the analogous stearate, resinate and acetate of copper with similar results. It is essential to avoid the cupric compounds which have been used heretofore but do not afford the advantages of the present invention.

Various changes may be made in the details of procedure and the apparatus used without departing from the invention or sacrificing the advantages thereof.

I claim:

1. The method of eliminating sulphur in the form of hydrogen sulfide, mercaptans or disulfides from liquid hydrocarbons which comprises treating the liquid hydrocarbon with cuprous naphthenate.

2. The method of eliminating sulphur in the form of hydrogen sulfide, mercaptans or disulfides from liquid hydrocarbons which comprises heating the liquid hydrocarbon with cuprous naphthenate.

3. The method of eliminating sulfur in the form of hydrogen sulfide, mercaptans or disulfides from liquid hydrocarbons which comprises dissolving cuprous naphthenate in the liquid hydrocarbon.

4. The method of eliminating sulphur in the form of hydrogen sulfide, mercaptans or disulfides from liquid hydrocarbons which comprises dissolving cuprous naphthenate in the liquid hydrocarbon and heating the solution.

5. The method of obtaining a hydrocarbon fraction substantially free from hydrogen sulfide, mercaptans and disulfides which comprises adding cuprous naphthenate to a distillate containing sulfur compounds, reacting the sulfur compounds with the cuprous naphthenate, and separating the compounds thus formed from the original distillate.

CHARLES O. HOOVER.

REFERENCES CITED

The following references are of record in the file of this patent:

UNITED STATES PATENTS

| Number | Name | Date |
| --- | --- | --- |
| 1,365,894 | Day | Jan. 18, 1921 |
| 2,042,053 | Hoover | May 26, 1936 |
| 2,091,239 | Hall | Aug. 24, 1937 |
| 2,276,526 | Von Fuchs et al | Mar. 17, 1942 |

FOREIGN PATENTS

| Number | Country | Date |
| --- | --- | --- |
| 514,402 | Great Britain | Nov. 26, 1941 |